(12) United States Patent
Morita

(10) Patent No.: US 12,177,391 B2
(45) Date of Patent: Dec. 24, 2024

(54) SERVER SYSTEM, METHOD FOR CONTROLLING SERVER SYSTEM, AND STORAGE MEDIUM

(71) Applicant: CANON KABUSHIKI KAISHA, Tokyo (JP)

(72) Inventor: Keisuke Morita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/050,828

(22) Filed: Oct. 28, 2022

(65) Prior Publication Data

US 2023/0139798 A1 May 4, 2023

(30) Foreign Application Priority Data

Oct. 29, 2021 (JP) .................................. 2021-177089

(51) Int. Cl.
*G06F 15/00* (2006.01)
*H04N 1/00* (2006.01)
*H04N 1/42* (2006.01)

(52) U.S. Cl.
CPC ..... *H04N 1/00233* (2013.01); *H04N 1/00217* (2013.01); *H04N 1/00244* (2013.01); *H04N 1/00482* (2013.01); *H04N 1/42* (2013.01)

(58) Field of Classification Search
CPC ........... H04N 1/00233; H04N 1/00212; H04N 1/00217; H04N 1/00244; H04N 1/00408; H04N 1/00482; H04N 1/42

USPC ........................................................ 358/1.15
See application file for complete search history.

(56) References Cited

U.S. PATENT DOCUMENTS

| 2018/0167451 | A1* | 6/2018 | Yi ........................ H04L 65/1069 |
| 2020/0099642 | A1* | 3/2020 | Mishima ................ G06F 3/1257 |
| 2021/0055897 | A1* | 2/2021 | Tomihisa ................ H04L 51/10 |
| 2021/0165616 | A1* | 6/2021 | Yasuda .................. G06F 3/1259 |

FOREIGN PATENT DOCUMENTS

JP 2014168185 A 9/2014

* cited by examiner

*Primary Examiner* — Mark R Milia
(74) *Attorney, Agent, or Firm* — Canon U.S.A., Inc. IP Division

(57) ABSTRACT

A server system connected to a plurality of information processing apparatuses communicates with a system that provides a function of distributing an image and sound based on an uploaded file to the plurality of information processing apparatuses. The server system includes a receiving unit that receives a notification indicating that an object related to printing is selected, where the object is displayed in a function selection area displayed in response to selection of a predetermined object displayed together with an image based on the file, an acquisition unit that acquires information about the shared file, a second receiving unit configured to receive print settings for the file, and a transmitting unit that transmits, to a different server system, a file based on the acquired information and a print instruction based on the received print settings.

9 Claims, 12 Drawing Sheets

FIG. 4

| User ID | | 11111111-2222-··· |
|---|---|---|
| | Group ID | 22222222-aaaa-··· |
| | | 22222222-bbbb-··· |
| | | : |
| | Channel ID | 33333333-aaaa-··· |
| | | 33333333-bbbb-··· |
| | | : |
| | Domain Name | Printsystem.com |
| | : | |

| User ID (Group ID) | 12345678-1234-··· |
| --- | --- |
| Plugin ID | abcdefgh-1234-··· |
| App ID | XXXXXXXX-1111-··· |
| display name | CloudPrint Plugin |
| version | 1.2.34 |
| description | This app provides ··· |
| modified date time | 2000/1/23 |
| create by | ABC corp |
| plugin type | Print |
| : | |

FIG. 6

| User ID | 11111111-2222-... | 22222222-aaaa-... | 22222222-bbbb-... |
|---|---|---|---|
| Printer ID_1 | 12345678-abcd-... | 24242424-abab-... | 24682468-aabb-... |
| Printer Name_1 | CloudPrinter001 | CloudPrinter002 | CloudPrinter003 |
| Printer ID_2 | | | |
| Printer Name_2 | | | |
| ... | ... | ... | ... |

FIG. 7

| Printer ID | 12345678-abcd-··· |
|---|---|
| Printer Name | CloudPrinter001 |
| Model Name | △△△ 1234 |
| Status | Ready |
| GPS | 35.9030259,140.0510963 |
| Street address | x-x-x,aaaa,bbb-Shi ··· |
| Postal code | 302-0023 |
| : | : |
| Duplex | Duplex |
| Color | Monochrome |
| Staple | TRUE |
| : | : |

SERVER SYSTEM, METHOD FOR CONTROLLING SERVER SYSTEM, AND STORAGE MEDIUM

BACKGROUND

Field

The present disclosure relates to a server system, a method for controlling a server system, and a storage medium.

Description of the Related Art

In recent years, exchange of messages using business chat has become widespread in the work environment. Accordingly, an existing way of work has changed to a business chat-based way of work. For example, when a message having a file attached thereto is received, the file can be immediately viewed without downloading the file. In addition, the file can be directly edited and shared with another user.

In the case of a web conference, as described in Japanese Patent Laid-Open No. 2014-168185, an image captured by a camera used by a user who is making a voice call can be shared with other users. In addition, a file uploaded by a user to a cloud service can be displayed and shared by other users. In this way, a plurality of users at different locations can hold a conference while viewing the same image and making voice calls.

However, in existing web conferences, when a user wants to print a file shared during a conference, the user needs to search the web conference system for the file that the user wants to print, download the file to their own computer, and thereafter instruct a computer to print the file.

SUMMARY

According to an embodiment of the present disclosure, a server system connected to a plurality of information processing apparatuses communicates with a system that provides a function of distributing an image and sound based on an uploaded file to the plurality of information processing apparatuses. The server system includes a receiving unit configured to receive a notification indicating that an object related to printing is selected, wherein the object is displayed in a function selection area displayed in response to selection of a predetermined object displayed together with an image based on a shared file, an acquisition unit configured to acquire information about the shared file, a second receiving unit configured to receive print settings for the file, and a transmitting unit configured to transmit, to a different server system, a file based on the information acquired by the acquisition unit and a print instruction based on the print settings received by the second receiving unit.

Further features of the present disclosure will become apparent from the following description of exemplary embodiments with reference to the attached drawings.

BRIEF DESCRIPTION OF THE DRAWINGS

FIG. 4 illustrates user management information in the print plugin according to the embodiment.

FIG. 6 illustrates printer management information in the print plugin according to the embodiment.

FIG. 7 illustrates printer management information in a cloud print service according to the embodiment.

DESCRIPTION OF THE EMBODIMENTS

Embodiments of the present disclosure are described below with reference to the accompanying drawings.

First Embodiment

Figure 1:
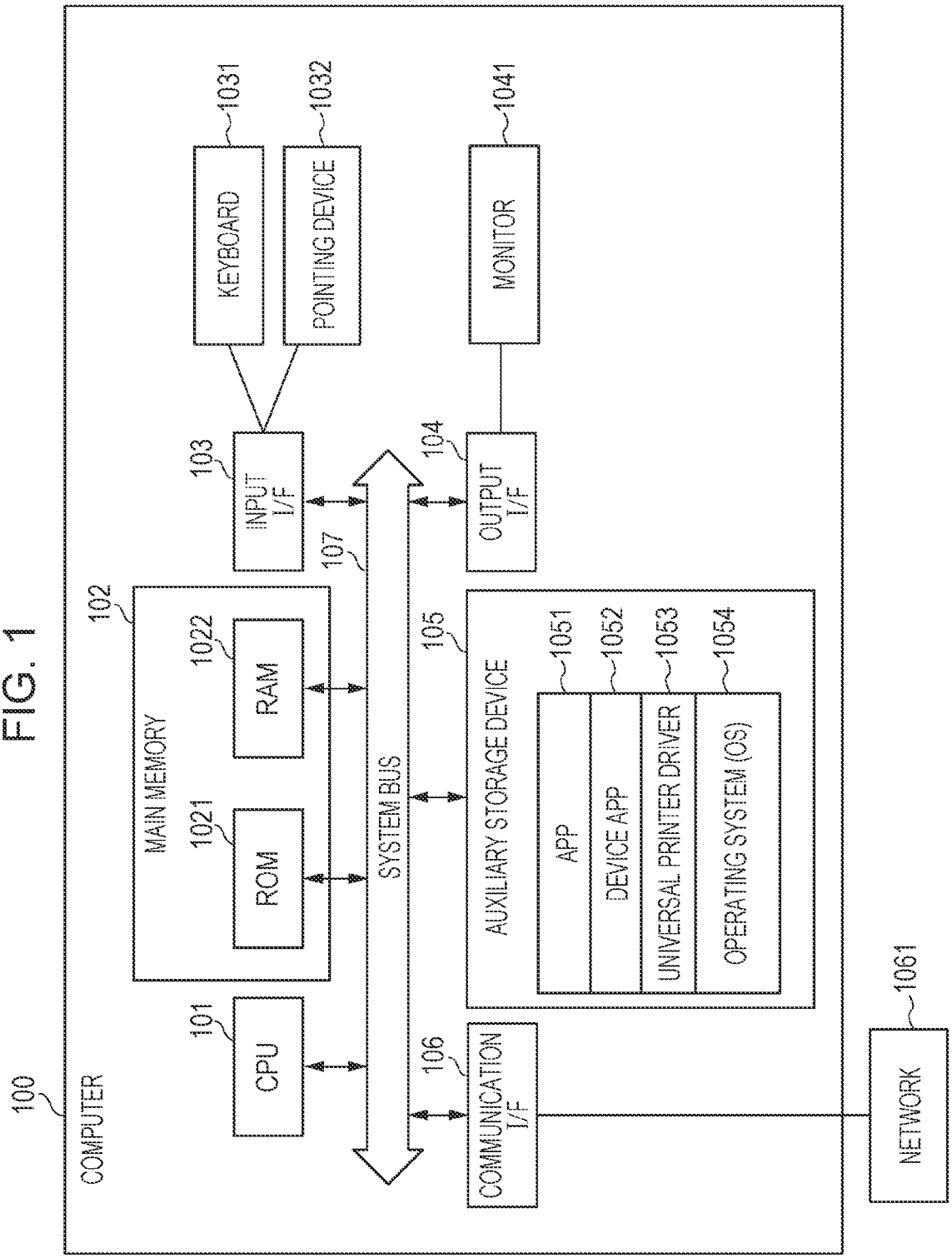
FIG. 1 is a block diagram of the configuration of the hardware and software of a computer system according to an embodiment.

FIG. 1 is a block diagram of the configuration of a system using a computer 100, which is an example of a widely used information processing apparatus, according to an exemplary embodiment. According to the present embodiment, by connecting the computer 100 to a business chat service that provides a chat function and a web conference function, a user can use the chat function and the web conference function. A user accesses the business chat service by using an application dedicated to the business chat service and installed on the computer 100 or a web browser installed on the computer 100.

A central processing unit (CPU) 101 performs control of the computer 100. A read only memory (ROM) 1021 and a random access memory (RAM) 1022 of a main memory 102 or an auxiliary storage device 105 store programs for controlling the computer 100. The RAM 1022 is also used as a work area when the CPU 101 performs a variety of processes. The auxiliary storage device 105 stores a variety of programs, such as an application (APP) 1051, a device application (device APP) 1052, a universal printer driver 1053, and an operating system (OS) 1054. An application dedicated to the business chat service and an application dedicated to the web browser are stored in the auxiliary storage device 105, loaded into the RAM 1022, and executed by the CPU 101.

Input devices, such as a keyboard 1031 and a pointing device 1032 (typically a mouse, a touch panel, or a touch pad), are connected to the computer 100 via an input interface (I/F) 103. An operation performed by the user is received via the input devices. An output device, such as a monitor 1041, is connected to an output I/F 104, and a user interface (UI) is displayed on the monitor based on an instruction from the program. Some terminals, such as a smartphone and a tablet, include the pointing device 1032 and the monitor 1041 integrated therewith. In FIG. 1, the pointing device 1032 and the monitor 1041 are separated from each other. A communication I/F 106 is connected to a network 1061 and can communicate with apparatuses external to the computer 100, such as a computer 1301, a computer 1302, and a printer 202 illustrated in FIG. 2. The above-described elements are connected to one another via a system bus 107, and data can be exchanged between the elements. The application 1051, the device application 1052, the universal printer driver 1053, and the OS 1054 that include the processing according to the present embodiment can be added to the auxiliary storage device 105 via a CD-ROM or a USB memory (not illustrated). Alternatively, the application 1051, the device application 1052, the universal printer driver 1053, and the OS 1054 can be added to the auxiliary storage device 105 via the network 1061. The present embodiment can be applied regardless of the device configuration if the functions of the present embodiment can be executed, unless otherwise specified. The system can be a system constituted by a single device or a plurality of devices or a system that is connected to a local network and that performs the processing.

Figure 2:
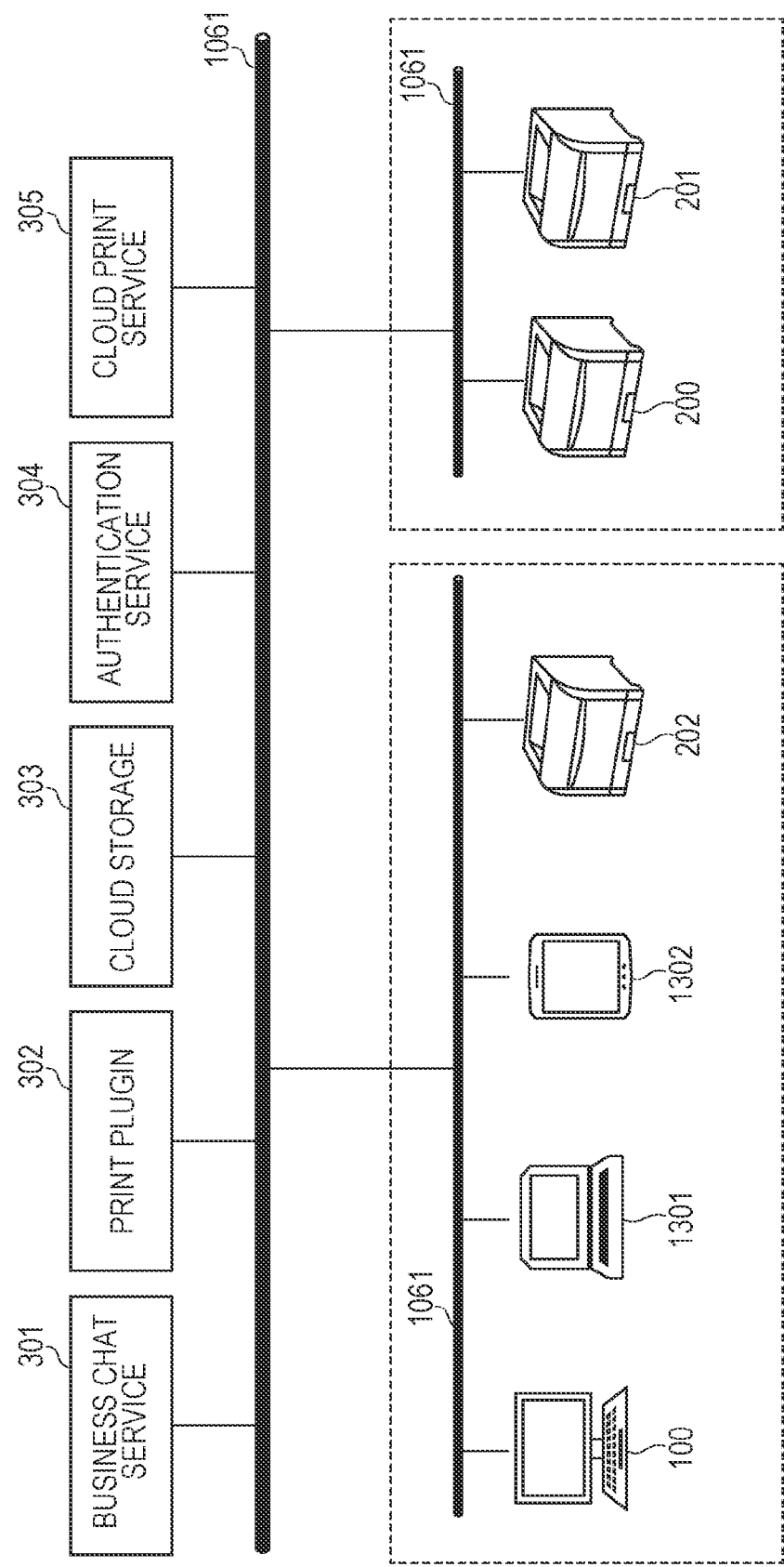
FIG. 2 is a configuration diagram of a communication environment in which a client is connected with a printer according to the embodiment.

FIG. 2 is a schematic illustration of the environment of the network 1061 according to the exemplary embodiment.

One or more of the computers 100, 1301, and 1302 that can generate a document and an image to be printed are connected to the network 1061. One or more printers 202 can be connected to the network 1061 or can be connected to the computers 100, 1301, and 1302 via a universal serial bus (USB). The computer 100 is connected to a business chat service 301, a print plugin 302, a cloud storage 303, an authentication service 304, and a cloud print service 305 via the network 1061, through which the computer 100 can communicate with printers 200 and 201 under a different network management. Examples of a network include small to large networks (ranging from a personal area network (PAN) to a local area network (LAN)). The above-described devices are connected to all the networks. Servers and printers can be connected via the Internet, such as a cloud. The communication method can be method other than wireless LAN communication conforming to the IEEE 802.11 standard, such as Bluetooth® or a mobile-phone line conforming to the International Mobile Telecommunication 2000 (IMT-2000) standard. The USB connection can be a connection via, for example, a USB hub or a switching equipment, in addition to direct connection.

The business chat service 301 is a server system that provides a chat function of sending and receiving messages from among a plurality of users and a web conference function of making voice calls while sharing moving images, file images and images displayed on a display unit of the computer 100. The business chat service 301 is composed of one or more computers. The hardware configuration of a computer for the business chat service 301 is the same as that of the computer 100 illustrated in FIG. 1 and, thus, a detailed description is omitted herein. The auxiliary storage device of a computer for the business chat service 301 stores programs for providing a chat function and a web conference function.

The print plugin 302 is a server system that cooperates with the business chat service 301 to add a print function to the services provided by the business chat service 301. The print plugin 302 includes one or more computers. The hardware configuration of the computer that constitutes the print plugin 302 is the same as that of the computer 100 illustrated in FIG. 1 and, thus, a detailed description is omitted herein. A print plugin 302 stores a program that operates in response to a notification received from the business chat service 301.

The cloud storage 303 is a server system that provides, for example, a function of storing and displaying a file uploaded by a user. The cloud storage 303 is composed of one or more computers. The hardware configuration of the computer of the cloud storage 303 is the same as the computer 100 illustrated in FIG. 1, and thus, a detailed description is omitted herein. A file uploaded to the cloud storage 303 can be viewed, downloaded, or edited by a user other than the user who uploaded the file, based on the permissions granted to the user.

The authentication service 304 is a server system that receives a user ID and a password from another service connected to the network 1061 and performs an authentication process. The authentication service 304 is composed of one or more computers. The hardware configuration of the computer that constitutes the authentication service 304 is the same as that of the computer 100 illustrated in FIG. 1, and as such, a detailed description is omitted herein.

The cloud print service 305 is a server system that provides a service for sending, to the printer 200 or 201, print data received from the computer 100 or another server system via the network 1061. The server system is composed of one or more computers. The hardware configuration of the computer is the same as that of the computer 100 illustrated in FIG. 1, and as such, a detailed description is omitted herein.

According to the present embodiment, printers 200, 201, and 202 operate as image forming apparatuses. Printers 200, 201, and 202 receive a print job from the cloud print service 305 and perform an image forming process based on the received print job.

Figure 3:
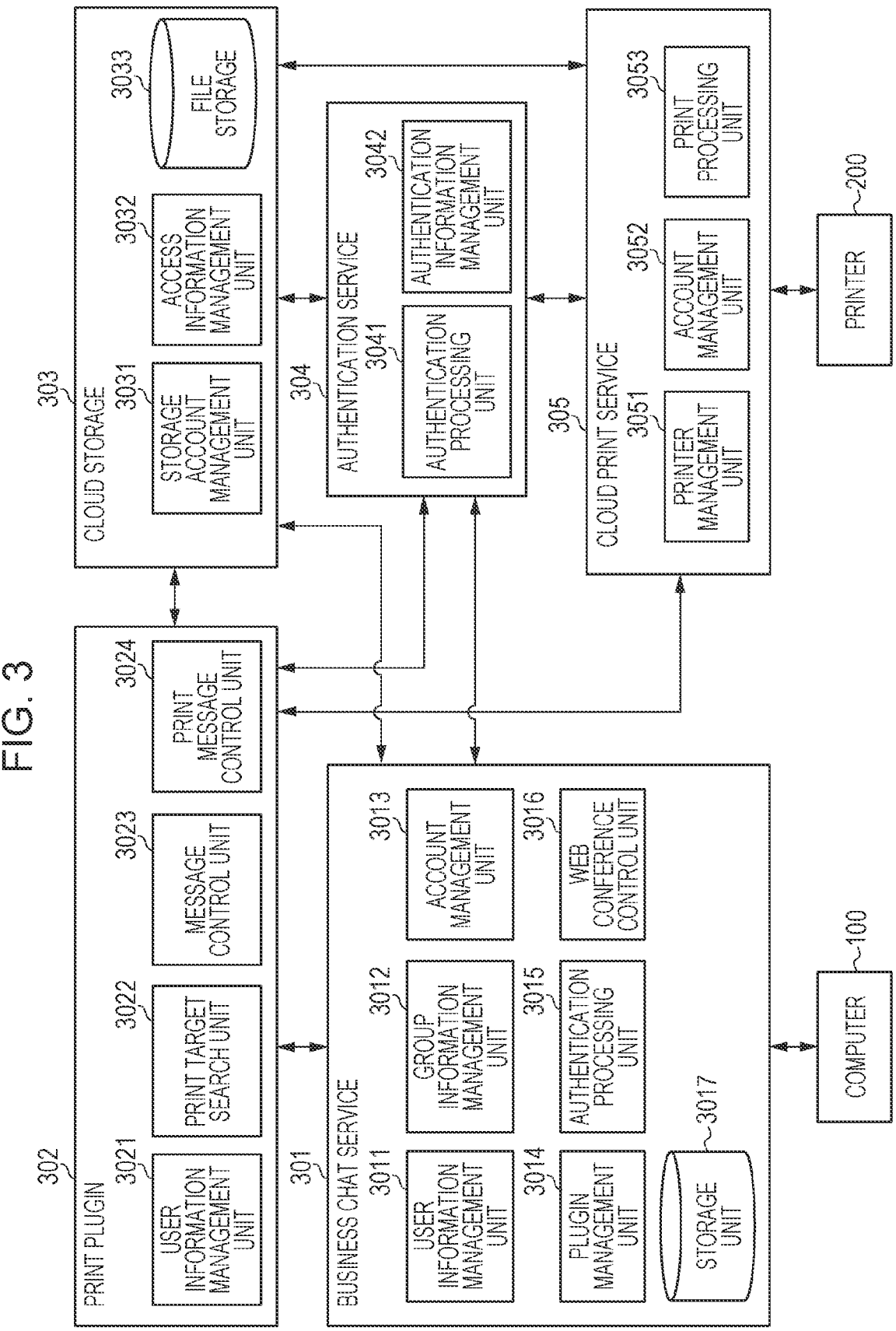
FIG. 3 is a configuration diagram of a system for performing printing from a print plugin of a business chat application according to the embodiment.

FIG. 3 illustrates the software configuration according to the present embodiment for calling the print plugin 302 from the business chat service 301 and performing a print process.

The overview of the business chat service 301 is described first. A user typically accesses the business chat service 301 to exchange text and files by chatting with other users or groups. This service can be executed via a web application running on a web browser or can be executed via a desktop application. For description purposes, the present embodiment refers to a technique where the print plugin 302 is called by selecting a "Print Plugin" call button 901 in a web conference screen using a video call illustrated in FIG. 9. This method is not seen to be limiting, and in other exemplary embodiments, the print plugin 302 can be called from a chat function, a function of displaying and accessing the content of the file storage on the cloud, or a calendar function of managing a user's calendar.

When performing a print operation, the user calls the print plugin 302 from the business chat service 301 and submits a print job to the cloud print service 305, which causes the printer 200 to perform a print process. In other exemplary embodiments, the print plugin 302 can be located in the business chat service 301 or on an external network as a separate service. The authentication service 304 performs user authentication for a user to access the business chat service 301 and the cloud print service 305, and enables the user to access each of the services based on their permission criteria. Thus, the user has smooth access across the services.

The present embodiment is described with reference to a common authentication service. In another exemplary embodiment, the user can switch between the authentication services 304 having different service types.

Next, the internal structure of the above-described services is discussed with respect to FIG. 3. The business chat service 301 includes a user information management unit 3011. The user information management unit 3011 manages information about chats conducted by users and information about files owned by users (the file access permissions and the locations at which the actual files are located). More specifically, as illustrated in FIG. 4, information about which group and channel a user belongs and which domain the user belongs to is stored. A user can belong to a plurality of groups and channels. For this reason, a user's ID is stored for each of the teams the user belongs to. Detailed information is linked to the user ID or the group ID and is managed in the form illustrated in FIG. 5. Information "User ID" illustrated in FIG. 4 is identification information used to identify an individual user. Information "Group ID" is identification information also called a tenant ID or a team ID, and is identification information used to identify the group to which the user of User ID belongs. Information "Channel ID" is identification information used to identify a channel in which the user participates. As used herein, the term "channel" refers to a subgroup consisting of a plurality of users belonging to the same group, where the subgroup is a lower-level group of the group. Information "Domain Name" is identification information used to identify a domain to which the user belongs. The user information management unit 3011 also manages, for each user, user calendar information, conference room/equipment management information, and other personal data.

A group information management unit 3012 manages chats held among members within the group and file information stored by the group. The group information management unit 3012 has basically the same functions as those of the user information management unit 3011, with and additional function corresponding to accesses from a plurality of users who have access permissions. The group information management unit 3012 manages data linked to a group, such as memos and recorded sound data in the group conference.

An account management unit 3013 manages which group a user belongs to and what type of permission and role the user is provided within the group. The account management unit 3013 grants appropriate access permission as necessary.

A plugin management unit 3014 manages information about plugins available to the business chat service 301. This function is accessed by a user and a group independently, and plugins corresponding to each user and each group are managed in the form of a list.

Figure 5:
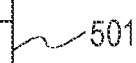
FIG. 5 illustrates a definition file of a business chat print plugin according to the embodiment.

Both the plugins owned by the group to which the user belongs and the plugins owned by the user are listed, and the user can use the plugins. As illustrated in FIG. 5, examples of particular data stored in the list include information, such as the ID of the plugin itself, the ID of the application to which the plugin belongs, and the display name, for the ID that identifies a user or a group. If the plugin itself requires the information about the application as well as more detailed information, such as information about a group and a channel in the groups, the respective IDs can be included. The plugins can perform an application for editing a document and spreadsheet data and an access and management function for a storage on the cloud in addition to the basic functions, such as a voice call and a conference function, and a file management function. The plugins can perform a variety of functions, for example, a viewer function of playing back a multimedia message including a file and a video that depend on a specific task, such as CAD, and a task management function of generating to-dos of an individual and generating, assigning, and tracking a task shared by individuals or a team. The present embodiment describes, from among the above-described functions, a print plugin that is used to ensure compatibility with external cloud print services. The plugin type information is stored in a "plugin type" field 501 in FIG. 5. By referring to this field, a plugin of a particular type can be retrieved or searched for. If the plugin operates as an independent application, "Application" is set in the "plugin type" field 501. If the plugin is related to a storage, such as a cloud storage, "Storage" is set in the "plugin type" field 501. In addition, "Viewer" is set if the plugin is a viewer, and "Task" is set if the plugin is used for task management. In the present example, "Print" indicating that the plugin is related to printing is set. Even if a plugin itself is located in the business chat service 301, the plugin can be present as an external service, and the plugin management unit 3014 can manage information such as the ID or URI for access and call the service as needed. The plugin can be a plugin located in a storage managed by the business chat service 301, a function of a compatible service, or a plugin that is uploaded from a local computer and is shared by the individuals and a team. If the plugin is located in the storage, the user accesses the page of the storage of the business chat service 301 that is within the APP or outside the APP, selects the desired plugin from the list, and performs an "Add" operation. In this manner, the plugin is made available. Internally, the "Plugin ID" in a plugin definition file illustrated in FIG. 5 is associated with the user ID of the user information management unit 3011. If the user is a group administrator of the business chat service 301 and performs an "Add as a group" operation, the plugin is added for the group, not for an individual user. Internally, "Plugin ID" of the plugin subjected to the "add" operation is associated with the group ID and is stored in the group information management unit 3012. A Plugin added to a group is displayed on a business chat screen for a user belonging to the group in the form of an icon or a selection menu item, so that the user can use the plugin without any additional user operation. A user can upload a plugin from a local computer, which is an operation to directly perform an "Add" operation. At this time, it is assumed that the plugin includes data equivalent to that illustrated in FIG. 5 as setting data, such as a manifest. A system administrator can add, to a group, a plugin separately introduced from a management page and the definition information describing a rule at the same time. In this case, the functions of the plugin are provided based on the described rule (for example, a predetermined subset of the functions is not displayed).

An authentication processing unit 3015 enables authentication for a plurality of services and centralized management of user account information, such as authentication information. The authentication processing unit 3015 performs a user authentication process using an ID and a password and a process for granting an appropriate permission to the user for a requested service.

Figure 9:
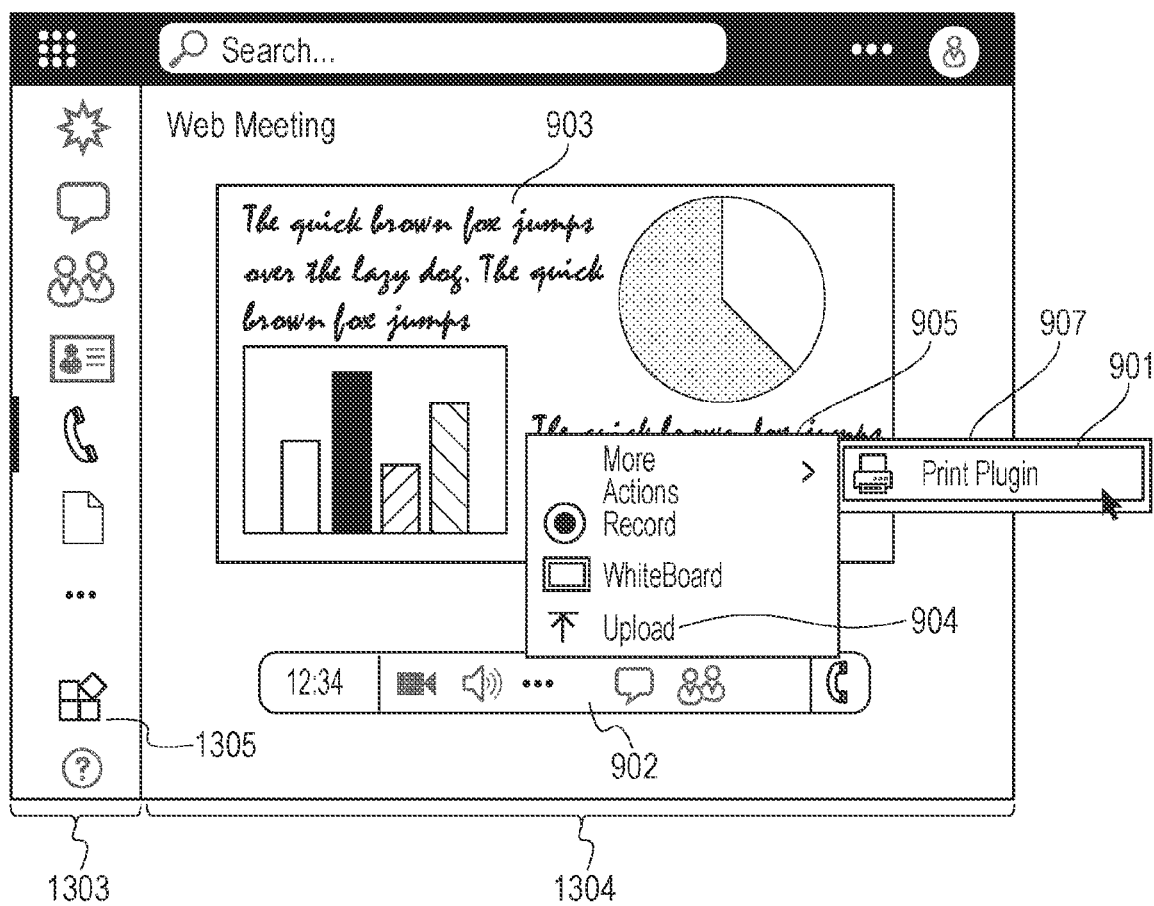
FIG. 9 illustrates a print screen displayed by the business chat web conference system according to the embodiment.

A web conference control unit 3016 performs control when a web conference is held using a business chat session. A web conference control unit 3016 performs display control, such as generation of a UI as illustrated in FIG. 9, and input/output of screens during a web conference. The Web conference control unit 3016 performs input/output of sound data, data transfer, and management of participant information. Files and programs of the web conference system are stored in the web conference control unit 3016 of the business chat service 301. The web conference control unit 3016 is accessed by the computer 100, the computer 1301, and the computer 1302 and, generates a user interface (UI) including controls illustrated in FIG. 9 and delivers the UI to any computes that has accessed the web conference control unit 3016. The computer 100 is used to upload presentation files in advance to the cloud storage 303 either via the web conference screen illustrated in FIG. 9 or directly. This enables the user to make a presentation using a document stored in the cloud storage 303. In addition to uploading a file, the user can display the screen that the user operates in a screen of another user, so that the presentation document is shared by another user. A storage unit 3017 stores file information uploaded to the business chat service 301. The file information can be the file itself or the reference information, such as the link to the file.

The software configuration of the print plugin 302 will now be described. A user information management unit 3021 manages information that the print plugin 302 has for each user.

More specifically, as illustrated in FIG. 6, the user information management unit 3021 stores the correspondence between a user ID and a printer ID (or a printer name) of a printer available to a user having the user ID. For example, a user having a user ID of "11111111-2222-. . . " can use a printer having a printer ID of "12345678-abcd-. . . " and a printer name of "CloudPrinter001". When the user can use another printer, the printer ID and printer name of the printer that can be used are set in the entries "Printer ID_2" and "Printer Name_2", respectively.

By using the information stored in the user information management unit 3021, it is possible to acquire the printer information illustrated in FIG. 7 stored in a printer management unit 3051 of the cloud print service 305. More specifically, examples of the printer information include the device name of a printer, status information, such as "ready" and "processing", and capability information indicating that, for example, the printer supports "color" printing and "stapling". The print plugin 302 stores, as the user information, temporary information, such as a response in a conversation (e.g., the answer "Yes" to the question "Would you like to print it?"), a default printer owned by the user, the setting data used for printing, and history data, such as a print date and time.

A print target search unit 3022 performs a process to identify the location of a print file that is a target of the print plugin 302. This function is provided for the purpose of responding to a call from a web conference that may not specify a file and call a plugin.

When the file to be printed is delivered from the business chat service 301, the access destination path or URI of the file is used. If the file is not explicitly specified due to, for example, screen sharing, the print target search unit 3022 identifies the file to be printed by referring to an execution program or causing the user to specify the file. The above-described process is described in detail below with reference to a flowchart illustrated in FIG. 11.

Figure 10:
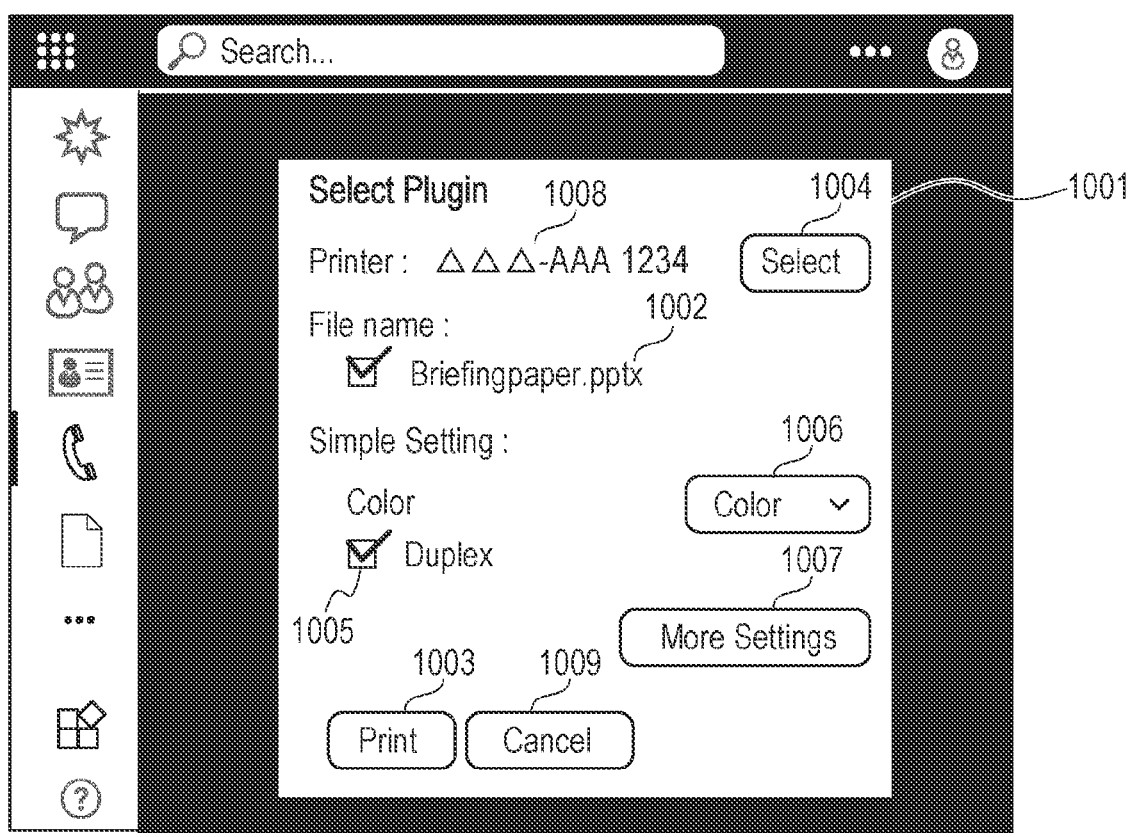
FIG. 10 illustrates a print setting screen displayed by the business chat web conference system according to the embodiment.

A message control unit 3023 performs a process for communicating with a user in the chat. For example, when authentication fails, the message control unit 3023 sends the message "Authentication is needed" to a user. When an input regarding how to use a function, such as a help, is received, the message control unit 3023 performs a process to provide the associated guidance. A print message control unit 3024 converts data necessary for printing, receives an input from the user, pops up a print setting card illustrated in FIG. 10, and generates and transmits a message card including controls enabling the user to set up print settings. The print message control unit 3024 calls a print process and sends messages for an external service. In FIG. 10, a print setting card is displayed without displaying the web conference screen illustrated in FIG. 9. A print setting card 1001 can be displayed on the web conference screen illustrated in FIG. 9 in a superimposed manner, or the print setting card 1001 can be displayed in the web conference screen illustrated in FIG. 9 so as not to overlap an area 903. In this manner, the user can set up the print settings while checking the progress of the web conference.

The software configuration of the cloud storage 303 will not be described. A storage account management unit 3031 manages and authenticates user account information. The account information can be account information managed independently by the cloud storage 303 or shared with the business chat service 301.

If the account of the cloud storage 303 is shared with the business chat service 301, the access permissions can be granted in a single instance if the user has logged in to a specific domain or a directory service in advance.

An access information management unit 3032 manages information regarding which group or who can access each file, a directory, a tenant area, and the like. For example, the access information management unit 3032 manages information such as the file name, file creator, and file size, and file read/write permission level setting. To set up the settings, for example, one file can have multiple settings for each owner and for each group to which the owner belongs. To set up the settings for a folder, user setting information regarding how deep in the folder hierarchy the read/write permissions are valid can be provided for a user. A file storage 3033 serves as an area for storing file access information and a file.

An authentication processing unit 3041 of the authentication service 304 authenticates the user using a variety of authentication techniques, such as a user ID and password, face or fingerprint authentication, or a pattern authentication. An authentication information management unit 3042 manages which organization/group the user belongs to and what permission is granted to which user and assigns appropriate file and storage access rights to the user based on the granted permissions. The authentication information management unit 3042 can manage license information purchased by the user and assign usage permissions on software, a plugin, and a service to the user based on the grade information about the purchased subscription.

The printer management unit 3051 of the cloud print service 305 performs a process to send a list of printers based on a scope managed by the user or group that has requested the service.

The printer management unit 3051 also manages printer capability information, such as information regarding duplex printing and color, text information, such as help text and notes from the administrator, and location data including GPS data and address information and send the information in response to a request from a user or a group. The information is updated by being acquired from the printer or the user who manually edits the information. An account management unit 3052 manages information regarding which user or group manages the printer and which user or group the printer is shared with. A print processing unit 3053 manages print settings, converts data for each service, and converts data into print data, such as file rendering, as needed.

The procedure for linking the identification information of the user using the business chat service 301, the identification information of the group, and the identification information of the print plugin to each other is described below.

The user first logs into the business chat service 301. The screen provided by the business chat service 301 is divided into two areas 1303 and 1304 as illustrated in FIG. 9.

The area 1303 is used as a menu bar commonly displayed when the user is using either the chat function or the web conference function. The area 1304 is used for displaying a screen corresponding to the function selected by the user using the area 1303. For example, as illustrated in FIG. 9, a web conference screen is displayed in the area 1304.

The user selects an object 1305 in the area 1304. The object 1305 is an object for displaying a list of applications that can add functions to the business chat service 301 and displaying a screen for instructing installation of an application that the user wants to use. When the user selects the object 1305, applications having various functions are displayed in the area 1304. An application corresponding to the print plugin 302 is also displayed. The user selects the application corresponding to the print plugin 302 and instructs installation in association with the user or group. The business chat service 301 reads out a manifest file of the application for which installation is instructed and associates the user or group identification information with plugin (application) information, as illustrated in FIG. 5. The above-mentioned manifest file is created by the vendor that developed the application and is registered in the business chat service 301 in advance. Through the above-described operation, the user can call the print plugin 302 using the screen provided by the business chat service 301.

Figure 8:
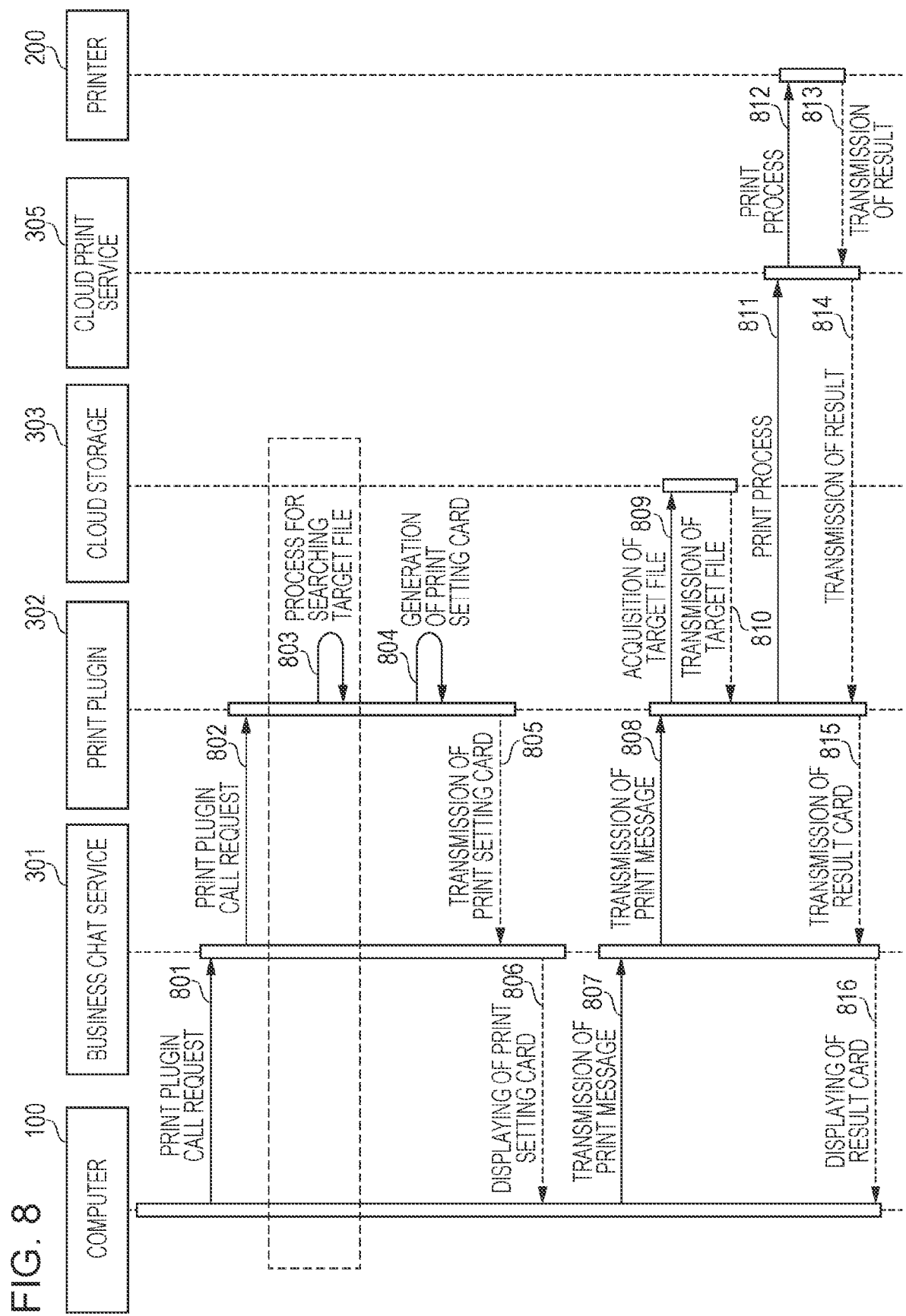
FIG. 8 is a sequence diagram for performing a print process using the print plugin of a business chat application according to the embodiment.

A printing example using the print plugin according to the present embodiment is described below with reference to FIG. 8. A method for activating the print plugin during a web conference of the business chat service 301 is provided for description purposes only.

FIG. 9 illustrates an example of a UI of the web conference function provided by the business chat service 301. The area 903 is used to display an image of a file shared in the conference. The user selects "Upload" 904 and selects a file stored in the computer 100 or a file stored in the cloud storage 303. The selected file is loaded, and the image is displayed in the area 903. The image in the area 903 is displayed on the computer 100 as well as on computers used by other users participating in the same web conference. The print plugin 302 supports the process of printing the shared file displayed in the area 903. A procedure for performing the print process using the print plugin 302 is described below.

The user first selects a three-point reader 902 in the web conference screen illustrated in FIG. 9. When the three-point reader 902 is selected, a submenu 905 is displayed. The displayed submenu 905 includes an item "More Actions" for calling the functions provided by the business chat service 301 and hidden functions. The item "More Actions" is an object for displaying a function selection area 907 for selecting, from among the applications added by the user to the business chat service 301, an application to be used. Instead of the three-point reader 902, another object can be used if the object is a predetermined object.

When the print plugin 302 is installed in the business chat service 301, the "Print Plugin" call button 901 is displayed in the function selection area 907. In this example, only the print plugin 302 is displayed in the function selection area 907. In addition to the print plugin, other plugins can be displayed, such as a plugin displaying the weather or displaying a special message card. When the user selects "Print Plugin", the business chat service 301 notifies the print plugin 302 of the selection, and the print plugin 302 performs a process required to print the shared file, such as a process for displaying a print setting screen.

As described above, the time at which the call button 901 for calling the print plugin 302 is selected is not optimized for printing, so the print plugin 302 needs to prepare the information required for printing, such as the reference destination of a file to be printed and the print settings. For this reason, in this sequence, the file to be printed is identified first. Thereafter, a screen for prompting the user to set up print settings is generated and displayed and then the print process is performed.

A process performed when a print instruction is submitted via the web conference screen is described below with reference to the sequence illustrated in FIG. 8. The computer 100 detects that the call button 901 is selected for calling the print plugin 302 in the web conference screen illustrated in FIG. 9 and notifies the business chat service 301 of the event first (step 801). Upon receiving the notification, the business chat service 301 sends a notification to call the print plugin 302 (step 802). Upon receiving the notification, the called print plugin 302 sends an authentication request to the authentication service 304 corresponding to the service that works together with the print plugin 302. This process can be skipped if authentication has already been performed by a higher system or an application or a browser in which the business chat service 301 is executed, and permission is obtained therefrom. When authentication using a different account is required for each of the target processes, for example, when a user is registered in the cloud storage and the cloud print service using different accounts, authentication is performed a plurality of times for each of the accounts. After the user performs an authentication process, the business chat service 301 is granted permission from the authentication service 304 (for example, receives an authentication token) as needed. In the processes of the sequence, when calling another service, each of the business chat service 301, the print plugin 302, the cloud storage 303, and the cloud print service 305 acquires permission from the authentication service 304 corresponding to another service and thereafter performs its own process.

The process performed when the print plugin 302 receives the notification in step 802 is described in more detail below. The notification received by the print plugin 302 includes the user identification information of the user who selected the "Print Plugin" call button 901 and information indicating that the print plugin 302 is called via the web conference screen. The print plugin 302 refers to the user information management unit 3021 and determines whether a token corresponding to the user identification information in the notification is stored. The above-mentioned tokens are a token for the print plugin 302 to access the cloud print service 305 and use the functions of the cloud print service 305 and a token for the cloud print service 305 to access the cloud storage 303 and use the functions of the cloud storage 303. The two tokens can be the same or different tokens.

If the token is not stored, the print plugin 302 causes the business chat service 301 to display login screens of the cloud storage 303 and cloud print service 305 and causes the business chat service 301 to receive the input user ID and password. The print plugin 302 sends the input user ID and password to the authentication service 304, receives an issued access token, and stores the access token in association with the user information of the business chat service 301. If the access token has already been stored, the print plugin 302 uses the access token to access the cloud print service 305 and acquires information about printers available to the user. The printer information is the printer ID and printer name illustrated in FIG. 6. Then, the print plugin 302 stores the user identification information of the business chat service 301 in association with the acquired printer name and printer ID.

The print plugin 302 searches for the file to be printed by inquiring of, for example, the business chat service 301 about the file (step 803). The process is described in more detail below with reference to the flowchart illustrated in FIG. 11.

Upon detecting the file to be printed, the print plugin 302 generates a print setting card 1001 illustrated in FIG. 10 (step 804). The print plugin 302 notifies the business chat service 301 of the generated print setting card information (step 805).

Upon receiving the notification from the print plugin 302, the business chat service 301 displays the print setting card on the computer 100 (step 806). A print setting card 1001 is a UI used to select a printer to be used for printing, select a file to be printed, and set up print settings. The name of the printer used for printing is displayed in a field 1008. When the user selects a "Select" button 1004, a list of printers registered in association with the User ID of the user logged in to the business chat service 301 is displayed. When the user selects a desired printer in the displayed list and applies the settings, the printer name displayed in the field 1008 is changed.

The files to be printed that are found through the above-described process are listed in the print setting card 1001 in the form indicated by a target file 1002. The user can determine whether to print the file by checking or unchecking the check box. In this way, an instruction as to whether the file is printed can be received. When a color mode setting object 1006 is selected, the color mode setting can be changed. Examples of a color mode setting value include "color", "monochrome", and "two-color printing". A check box 1005 is used to set whether to perform duplex printing. If the check box 1005 is checked, the print plugin 302 instructs the cloud print service to perform duplex printing. A "More settings" button 1007 is an object used to set up additional print settings. When the "More settings" button 1007 is selected, the print plugin 302 causes the business chat service 301 to display an extended print setting UI (not illustrated). The extended print setting UI enables the user to set up the paper size and paper type, staple setting, and punch setting. A "Cancel" button 1009 is an object used to close the print setting card and thereafter display the screen illustrated in FIG. 9.

The business chat service 301 accepts selection of the print button 1003 in the print setting card 1001 (step 807). The business chat service 301 sends the information about the file to be printed and the data of the file selected in the print setting card 1001 to the print plugin 302 (step 808).

The print plugin 302 sends a selected file acquisition request to the cloud storage 303 before submitting a print request (step 809). The cloud storage 303 transmits the requested target file (step 810). At this time, the target file received from the cloud storage 303 conforms to the format supported by the cloud print service 305. For example, if the data to be printed in the cloud print service 305 is the actual data of the file, the print plugin 302 receives the file as a data stream. However, if the data to be printed in the cloud print service 305 is data indicating the access destination, such as a URI or a link, the print plugin 302 receives the data as the access destination. If necessary, a process such as conversion of the data format of the file is performed during this process. If the file is at a location inaccessible to the cloud print service 305, such as when the file is located in a local area of the computer 100, a required process is performed, such as uploading the file to a location at which the permissions are valid.

When printing is ready to go, the print plugin 302 transmits a print job to the cloud print service 305 (step 811). Upon receiving the job, the cloud print service 305 performs printing on the printer 200 (step 812).

Subsequently, the cloud print service 305 receives a message indicating whether the printing succeeded or failed or an error code from the printer 200 and provides a notification of the result to the user as needed (steps 813 to 816).

By performing the above-described processing, printing can be performed via the web conference screen of the business chat service 301.

Figure 11:
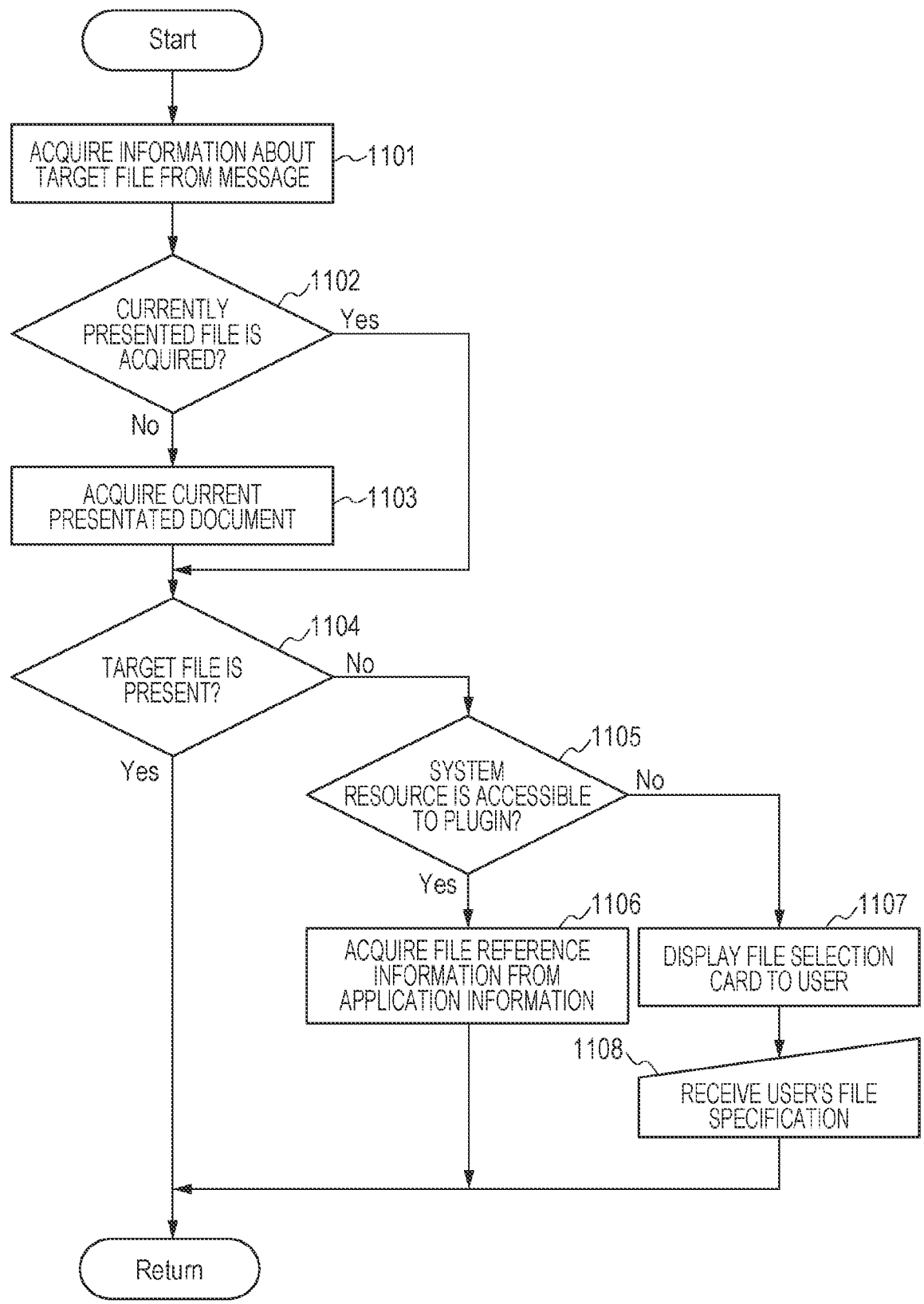
FIG. 11 is a flowchart of a method for searching for a file to be printed using the print plugin according to the embodiment.

FIG. 11 is a flowchart of a process performed by the print plugin 302 when the print plugin 302 searches for a file to be printed upon receiving a print request from the business chat service 301. Since the situation of this process differs based on the system configuration including the business chat service 301, the process may not be performed or can be redundantly performed. In such a case, a required configuration is appropriately selected or changed and, thus, the process is performed.

The processing described with reference to the flowchart illustrated in FIG. 11 is performed by a CPU of the computer constituting a server system that provides the print plugin 302.

Upon receiving a print request, the print plugin 302 acquires the information about a target file specified in a message received from the business chat service 301 (step 1101). When the user selects the "Print Plugin" call button 901 in the screen illustrated in FIG. 9, the business chat service 301 notifies the print plugin 302 of the identification information identifying the currently held web conference and the information about a file to be displayed in the area 903. The information about the file in the notification is, for example, the file name and the URL corresponding to the file path at which the data of the file is stored. The print plugin 302 stores the received file information.

The print plugin 302 determines whether the information about the file that is currently presented has been acquired in step 1011 (step 1102). Examples of the case where the information about the file that is currently presented has not been acquired include the case where the file screen in the area 903 is not shared, the case where the business chat service 301 fails to transmit the file information, and the like. If the file information has been acquired in step 1011, the processing performed by the print plugin 302 proceeds to step 1104. If the file information has not been acquired in step 1011, the print plugin 302 performs a process in step 1103.

The print plugin 302 sends a request for acquiring the information about the file displayed in the area 903 of the business chat service 301 (step 1103). The print plugin 302 then receives, from the business chat service 301, the information about the file to be displayed and shared in the area 903. Upon receiving the file information from the business chat service 301, the print plugin 302 stores the acquired file information. If no file screen is displayed in the area 903, the business chat service 301 does not send back file information to the print plugin 302. At this time, if the acquired information is only the file name of a document currently being presented and the file itself is not accessible, the file is searched for by acquiring the directory information where the document is located from, for example, the information about the files related to the conference and using the acquired directory information.

The print plugin 302 performs a conversion process into a URI that enables the file itself to be accessed.

The print plugin 302 then determines whether the target file is found (step 1104).

The print plugin 302 determines whether the file information has been acquired in step 1101 or 1103. If, in step 1101 or 1103, the file information has been acquired, the print plugin 302 acquires the file name from the acquired file information. The print plugin 302, based on acquiring the file name, generates a print setting card, which is a print setting screen where the acquired file name is displayed, and instructs the business chat service 301 to display the print setting card.

If, in step 1101 or 1103, the file information is not acquired, the print plugin 302 separately performs a process to search for or specify the file outside the business chat service 301. Examples of the case in which the process is performed include the case in which the file is in a local computer or a personal online storage and the case in which only displaying a screen, not a file, is shared in a web conference.

If, in step 1104, the print file is found, the print plugin 302 determines whether the system on the cloud or the system in a local computer is accessible first (step 1105). This determination corresponds to a determination whether the print plugin 302 operates as a desktop application that can access the management right or a web application that can access a special resource.

If the print plugin 302 can access the file and the application related to the file, the application to be used for printing is identified. For example, when an active application is acquired from a user execution process or when there is an application that is in execution on the business chat service 301, the application is identified. If an application can be identified, the print plugin 302 obtains the reference to the file from the reference destination information regarding the file opened by the application (step 1106).

Figure 12:
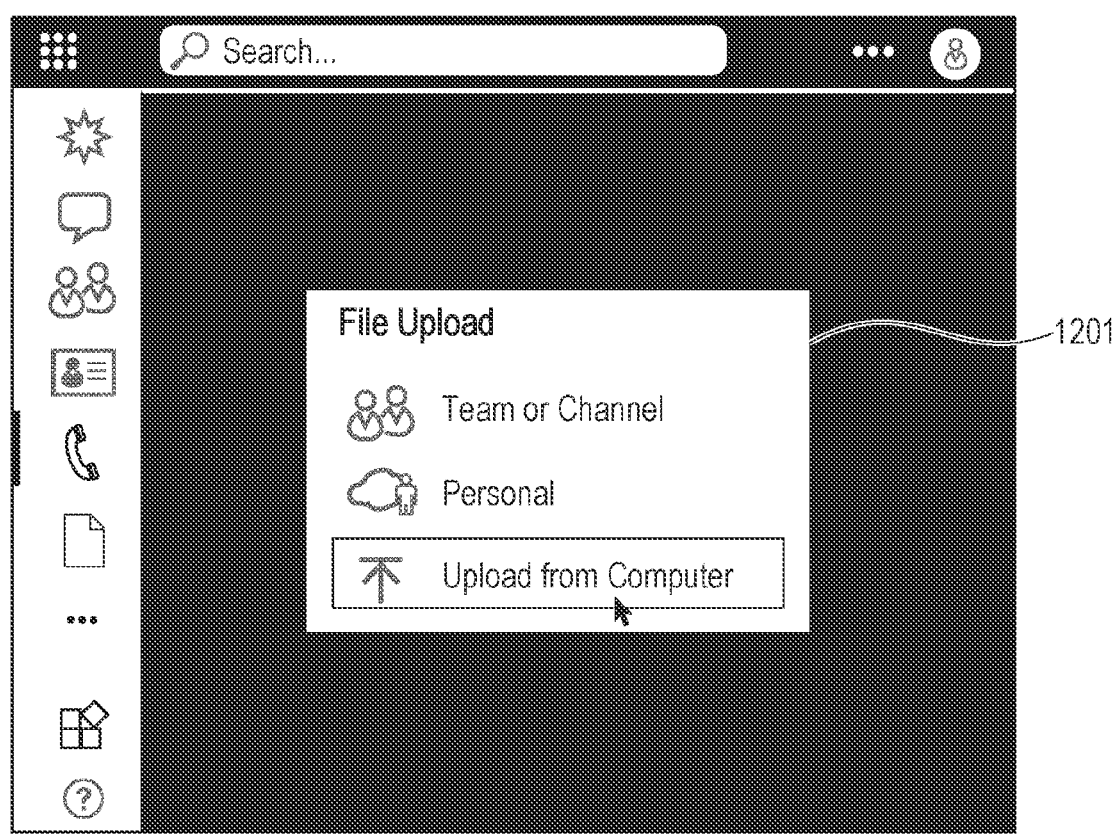
FIG. 12 is a file specification screen of the business chat system according to the embodiment.

If in step 1105, the file being displayed is not at an accessible location, the print plugin 302 instructs the business chat service 301 to display a file selection card, such as a file specification screen 1201 illustrated in FIG. 12, (step 1107). The print plugin 302 receives, from the business chat service 301, the information about the file specified by the user via the displayed file specification screen (step 1108). In this example, a cloud storage for the team, a cloud storage for an individual person, or uploading the file from a local computer is selected to specify the file. The files listed for a "cloud storage" category are accessible to the user. When the file is selected, the access permission is set so that the file is accessible to all members participating in the web conference.

By performing the above-described processing, the print plugin 302 searches for the file to be printed for the eb conference.

In this manner, the file used for a presentation made using the screen during the web conference can be acquired and printed.

The present disclosure is also realized by executing the following processing. That is, software (a program) that realizes the functions of the above-described embodiments is supplied to a system or apparatus via a network or various storage media, and the computer (or a CPU, an MPU, or the like) of the system or apparatus reads and executes the program code. In this case, the computer program and the storage medium storing the computer program constitute the present disclosure.

According to the present disclosure, during a web conference, the user can print a file from a web conference system without searching for which file is shared on the web conference.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2021-177089 filed Oct. 29, 2021, which is hereby incorporated by reference herein in its entirety.

What is claimed is:

1. A server system connected to a plurality of information processing apparatuses, the server system communicating with a system that provides a web meeting function in which an image included in an uploaded file and sound are shared between the plurality of information processing apparatuses, the server system comprising:

a controller, wherein the controller receives a notification indicating that an object related to a printing function is selected, the object being displayed in a function selection area displayed in response to selection of a predetermined object displayed together with the image included in the file, wherein the controller acquires the file including the image that is being displayed as a presentation document by a presenter in the web meeting function when the object related to the printing function is selected, wherein, in a case where the controller is unable to acquire the file including the image in a state that the image is being displayed as the presentation, the controller displays a screen for selecting a method for sharing the file, the method including a method for uploading the file from an information processing apparatus to the web meeting function and a method for uploading the file from a cloud storage to the web meeting function, wherein, in a case where the controller is unable to acquire the file including the image in a state that the image is being displayed as the presentation and where the controller has acquired a file name of the file including the image, the controller searches, using the file name, the file from a folder corresponding to the web meeting function, and wherein the controller receives print settings for the file; and a communicator that transmits, to a cloud print service, the acquired file and a print instruction based on the print settings received by controller.

2. The server system according to claim 1, wherein the controller further acquires information of the file, the information being a file name.

3. The server system according to claim 2, wherein the information of the file is information indicating a location where the file is stored.

4. The server system according to claim 2, wherein the server system instructs one of the plurality of information processing apparatuses to display a print setting screen including the acquired information of the file.

5. The server system according to claim 4, wherein the controller acquires, from the cloud print service, information of an image forming apparatus that is available to the cloud print service for the printing function, and wherein the print setting screen is a screen based on the information of the image forming apparatus acquired from the cloud print service.

6. The server system according to claim 1, wherein the controller receives a user's specification of a file if the information of the file is not acquired by the controller, wherein the communicator transmits the file specified by the user and the print settings to the different server system.

7. The server system according to claim 1, wherein the case where the controller is unable to acquire the file including the image in the state that the image is being displayed as the presentation is a case where the controller is unable to access to the file including the image in the state that the image is being displayed as the presentation.

8. A method for controlling a server system connected to a plurality of information processing apparatuses, the server system communicating with a system that provides a web meeting function in which an image included in an uploaded file and sound are shared between the information processing apparatuses, the method comprising:

receiving a notification indicating that an object related to a printing function is selected, wherein the object is displayed in a function selection area displayed in response to selection of a predetermined object displayed together with the image included in the file;

acquiring the file including the image that is being displayed as a presentation document by a presenter in the web meeting function when the object related to the printing function is selected;

displaying, in a case where the file including the image is unable to be acquired in a state that the image is being displayed as the presentation, a screen for selecting a method for sharing the file, the method including a method for uploading the file from the information processing apparatus to the web meeting function and a method for uploading the file from a cloud storage to the web meeting function;

searching, in a case where the file including the image is unable to be acquired in a state that the image is being displayed as the presentation and where a file name of the file including the image has been acquired, the file from a folder corresponding to the web meeting function using the file name;

receiving print settings for the file; and transmitting, to a cloud print service, the acquired file and a print instruction based on the received print settings.

9. A non-transitory computer-readable storage medium storing one or more programs including executable instructions that, when executed by a computer, causes the computer to perform a method for controlling a server system connected to a plurality of information processing apparatuses, the server system communicating with a system that provides a web meeting function in which an image included in an uploaded file and sound are shared between the information processing apparatuses, the method comprising:

receiving a notification indicating that an object related to a printing function is selected, wherein the object is displayed in a function selection area displayed in response to selection of a predetermined object displayed together with the image included in the file;

acquiring the file including the image that is being displayed as a presentation document by a presenter in the web meeting function when the object related to the printing function is selected;

displaying, in a case where the file including the image is unable to be acquired in a state that the image is being displayed as the presentation, a screen for selecting a method for sharing the file, the method including a method for uploading the file from the information processing apparatus to the web meeting function and a method for uploading the file from a cloud storage to the web meeting function;

searching, in a case where the file including the image is unable to be acquired in a state that the image is being displayed as the presentation and where a file name of the file including the image has been acquired, the file from a folder corresponding to the web meeting function using the file name;

receiving print settings for the file; and transmitting, to a cloud print service, the acquired file and a print instruction based on the received print settings.

* * * * *